Feb. 4, 1930.     F. BUKOVE     1,746,141
VALVE GEAR
Filed Jan. 10, 1925      4 Sheets-Sheet 1
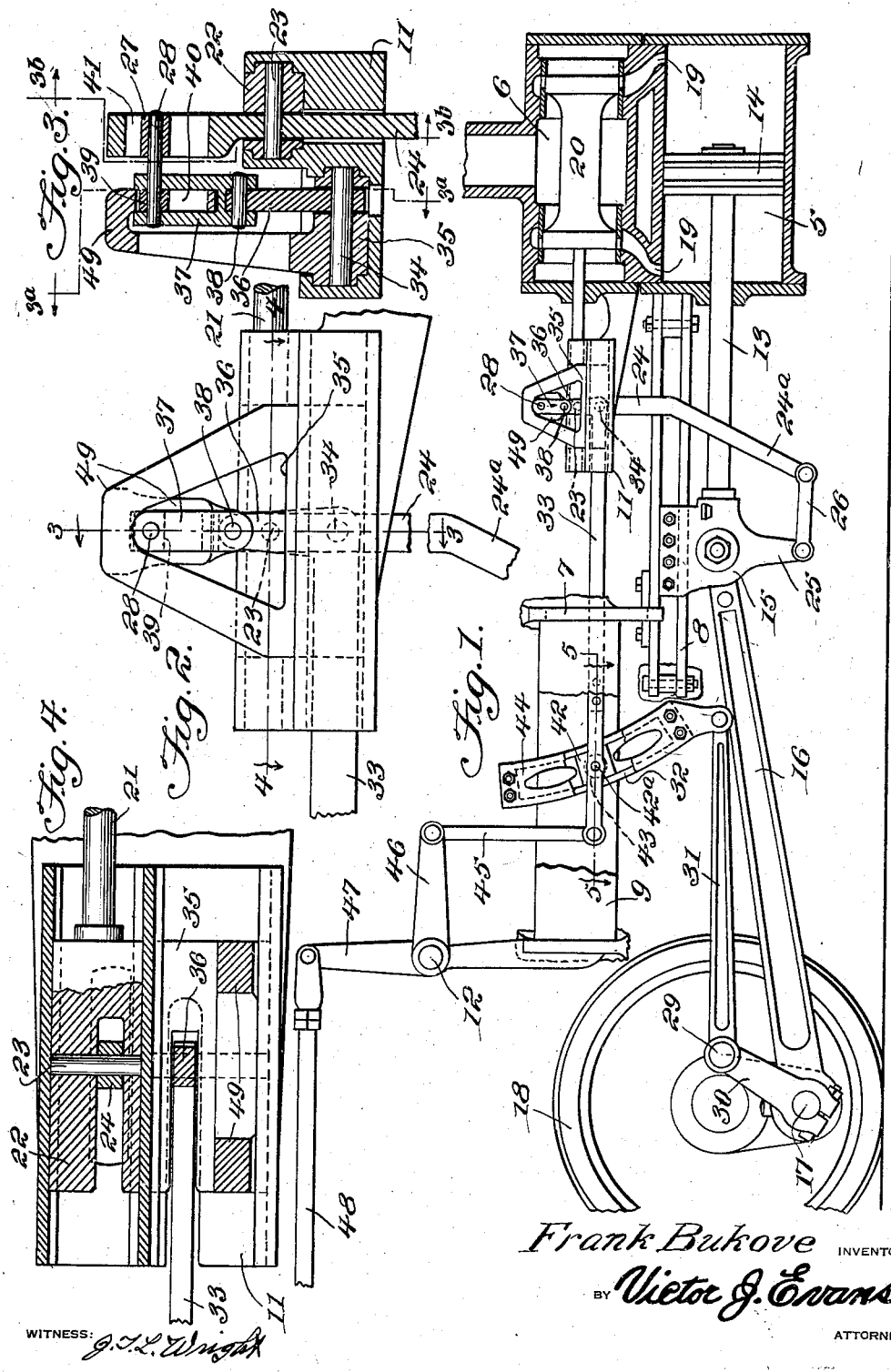
Frank Bukove INVENTOR
BY Victor J. Evans
ATTORNEY
WITNESS:

Feb. 4, 1930.  F. BUKOVE  1,746,141
VALVE GEAR
Filed Jan. 10, 1925  4 Sheets-Sheet 2
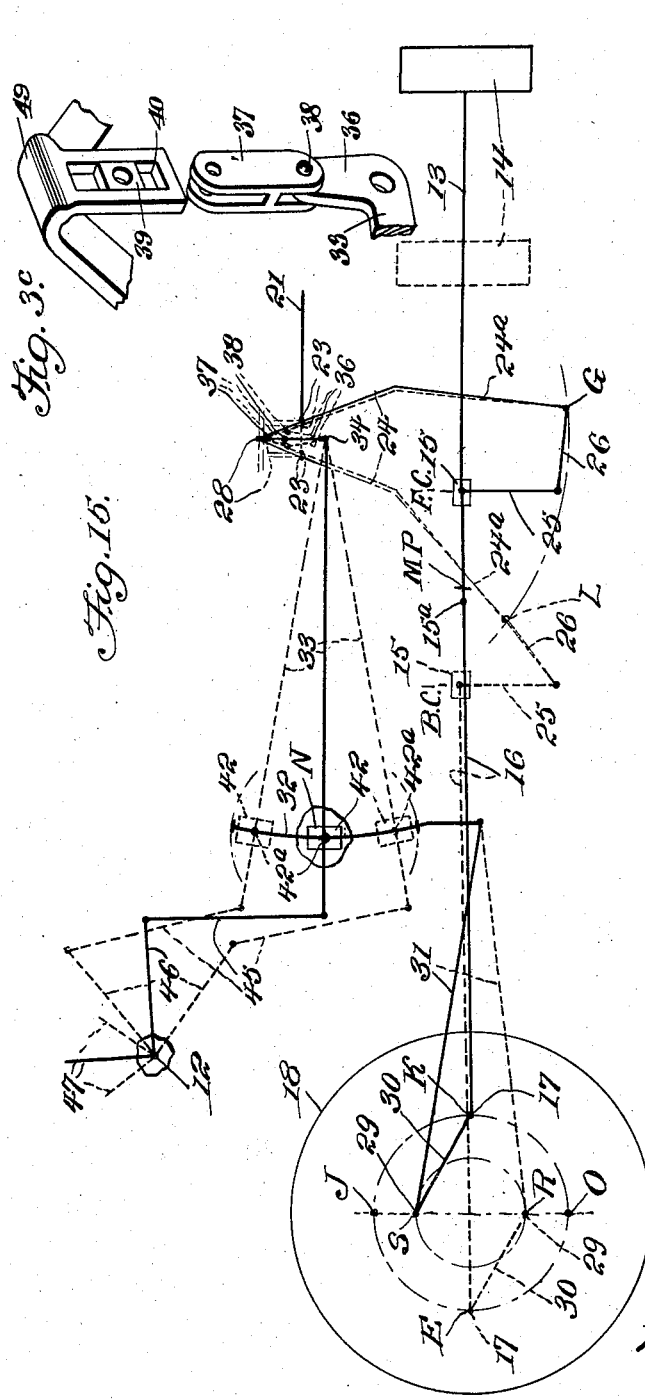
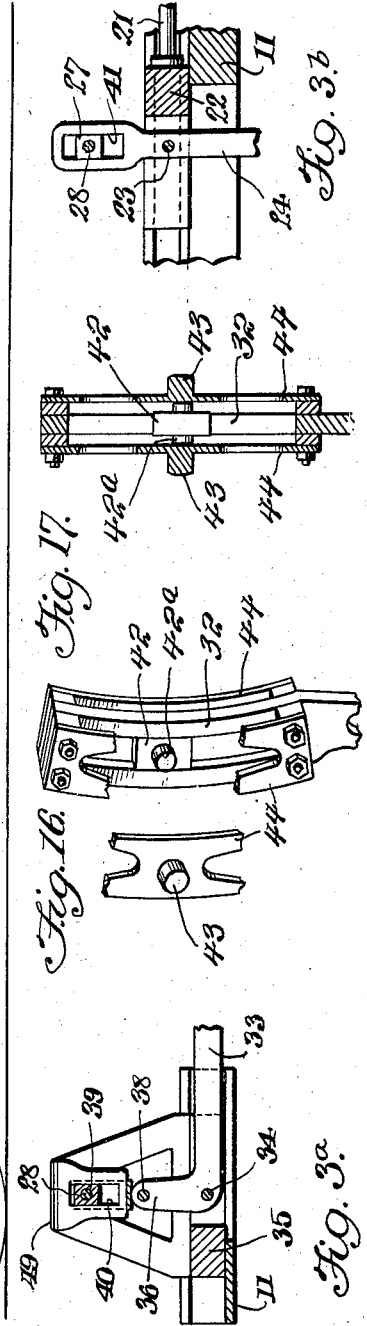
Frank Bukove
INVENTOR
BY Victor J. Evans
ATTORNEY
WITNESS: J. T. L. Wright

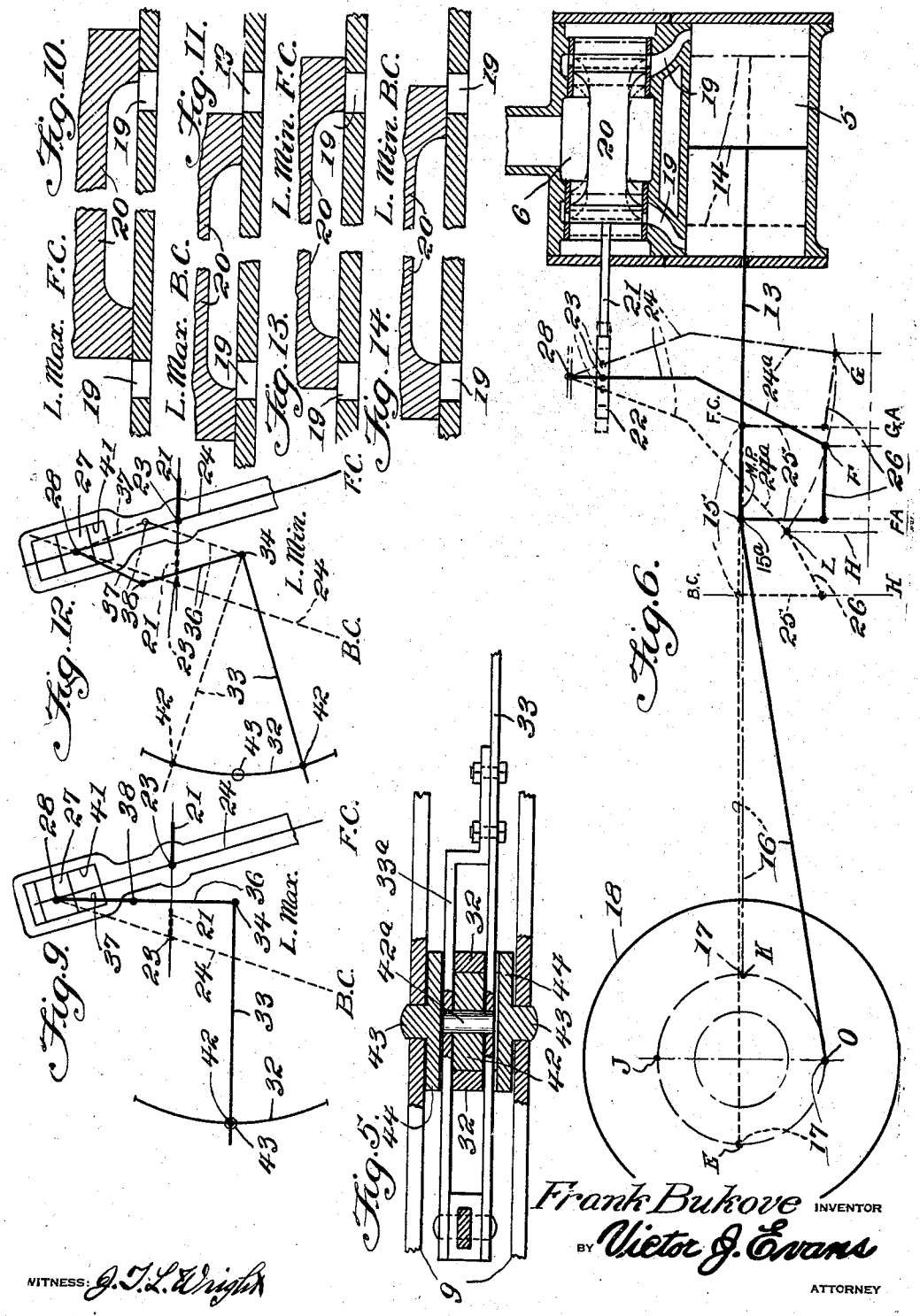

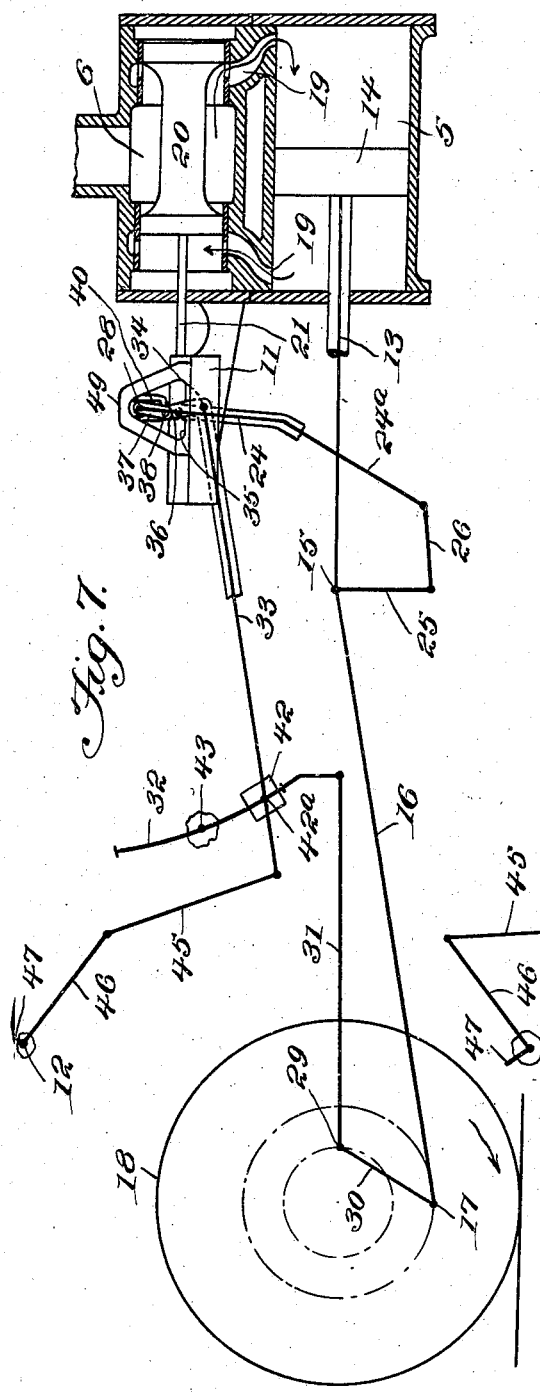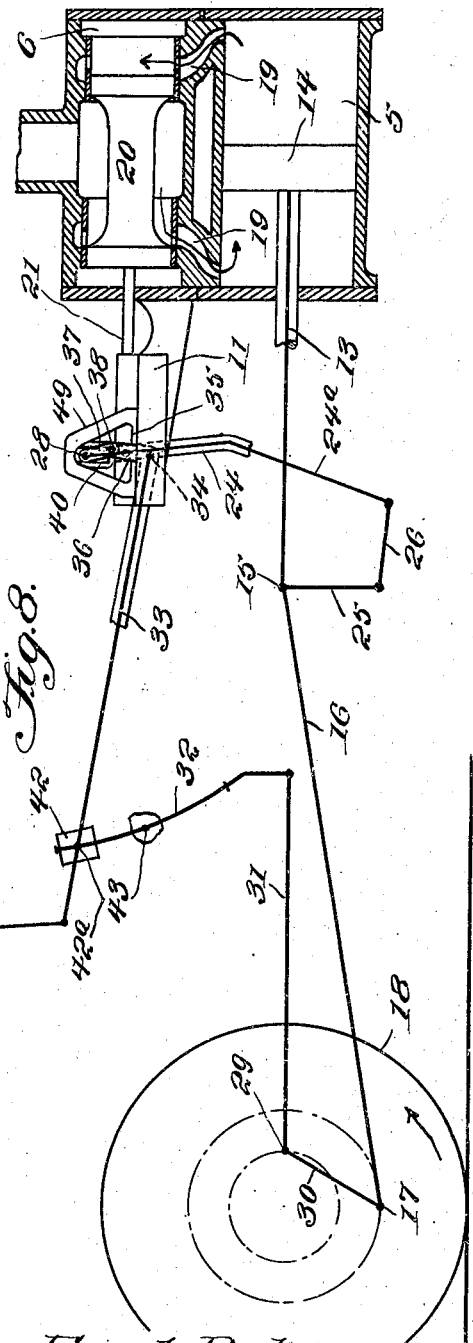

Patented Feb. 4, 1930

1,746,141

UNITED STATES PATENT OFFICE

FRANK BUKOVE, OF RATON, NEW MEXICO

VALVE GEAR

Application filed January 10, 1925. Serial No. 1,677.

This invention relates to improvements in valve gears and has particular relation to improvements in locomotive valve gears of the Walscheart type.

The primary object of the present invention is to so improve the construction and operation of Walscheart type locomotive valve gears, that the lead of the valve will be automatically altered in inverse proportion to the variation of the cut off by the adjustment of the reversing lever, and will operate in such manner during either forward or reverse movements of the reversing lever.

Another object of the invention is to overcome an error in the operation of the valve due to the angularity of the main connecting rod, the present invention providing a uniform lap and lead movement for the valve.

A further object of the invention is to provide a locomotive valve gear whereby an increased accuracy and efficiency of the gear is obtained, so that the valve events will occur during each cycle of valve action in conformity with the proper relative position of the main crank pin and the stroke of the piston.

A still further object of the invention is to provide a locomotive valve gear whereby an economical distribution of steam is obtained, and the correctness of the adjustments of the gear may be accomplished in a most efficient manner.

With the above and other objects in view, the invention further includes the following novel features and details of construction, to be hereinafter more fully described, illustrated in the accompanying drawings and pointed out in the appended claims.

In the drawings:—

Figure 1 is a fragmentary side elevation partly in section illustrating the application of the invention.

Figure 2 is an enlarged fragmentary side elevation showing the upper end of the combination lap and lead lever and contiguous parts.

Figure 3 is a section on the line 3—3 of Figure 2.

Figures 3ª and 3ᵇ are sectional views taken respectively on the lines 3ª—3ª and 3ᵇ—3ᵇ of Figure 3.

Figure 3ᶜ is a detail view showing the crosshead and its connections with the radius rod.

Figure 4 is a similar view on the line 4—4 of Figure 2.

Figure 5 is an enlarged fragmentary sectional view taken substantially on the line 5—5 of Figure 1.

Figure 6 is a diagrammatic view illustrating in full and dotted lines the positions of the combination lap and lead lever with the piston in mid and dead center positions.

Figure 7 is a diagrammatic view showing the valve gear in forward position.

Figure 8 is a similar view with the gear in reverse position.

Figure 9 is a diagrammatic view illustrating the position of the tumbler arm and shifting link at maximum lead front and back dead center positions.

Figure 10 is a fragmentary view showing the position of the valve at maximum lead when the piston is at the limit of its forward stroke.

Figure 11 is a like view of the valve at maximum lead when the piston is at the limit of its back stroke.

Figure 12 is a view similar to Figure 9 showing the position of the tumbler arm and shifting link at minimum lead front and back dead center positions.

Figure 13 is a fragmentary view showing the position of the valve at minimum lead when the piston is at the limit of its forward stroke.

Figure 14 is a similar view showing the position of the valve at minimum lead when the piston is at the limit of its back stroke.

Figure 15 is a diagrammatic view illustrating in full and dotted lines the position of the combination lever and driver wheel at dead center positions.

Figure 16 is a perspective view of the link with one of the link plates partly broken away and illustrated at side of the link.

Figure 17 is a longitudinal sectional view through the link.

Referring in detail to the drawings wherein like characters of reference denote corresponding parts, the reference character 5 indicates the cylinder of a locomotive, 6 the valve chamber, 7 a part of the locomotive frame, 8 the crosshead guides and 9 the link supports. The engine piston is indicated at 14 and is connected to the crosshead 15 by the piston rod 13, the crosshead 15 having connected thereto one end of the main connecting rod 16. The opposite end of the rod 16 is mounted upon the main crank pin 17 of the locomotive driving wheel 18.

The reference character 20 indicates a piston type valve which operates within the valve chamber 6 and which has connected thereto a valve rod 21, the latter being connected to the valve crosshead 22 which operates within a valve guide 11.

The main valve crosshead 35 has pivotally secured thereto by means of a pivot pin 34, one end of a radius rod 33, while extending from this rod is a right angularly disposed tumbler arm 36 to which is pivotally connected a shifting link 37. The link 37 has in turn pivotally connected thereto by means of a combination fulcrum pin 28, a bearing block 39 which is slidable in a slot 40 provided in one end of an inverted substantially U-shaped arm 49, the latter being carried by and extending from the radius rod crosshead 35. The pivot pin which connects the arm 36 with the link 37 is indicated at 38.

The combination fulcrum pin 28 forms a part of a connection between the link 37 and a combination lap and lead lever 24 and for this purpose the upper end of the lap and lead lever is provided with a slot 41 within which is mounted a bearing block 27 carried by the pin 28. The combination lap and lead lever 24 is pivotally secured as indicated at 23 to a valve crosshead 22, which like the main valve crosshead 35 operates in the crosshead guide 11.

The radius rod 33 extends within the link supports 9 where it has secured thereto an arm 33ª which is spaced from the rod for the reception of a curved oscillating link 32. Located within the link 32 is a link block 42 which is pivotally secured to the radius rod by a pivot pin 42ª. The link 32 is mounted between link plates 44 and the latter are pivotally secured to the link support by trunnions 43. The radius rod is pivotally connected to one end of a hanger 45 whose opposite end is pivotally secured to an arm 46, the latter being fast upon a rocker shaft 12. This shaft has extending therefrom an arm 47 which is connected to the reverse rod 48 of the locomotive reversing lever.

Pivotally connected to the curved oscillating link 32 or to an arm which extends from said link is one end of an eccentric rod 31. The opposite end of this rod is connected by means of a crank pin 29 with the return crank 30 whose opposite end is secured upon the main crank pin 17.

The combination lap and lead lever 24 is provided with a bend so that its lower end is offset from the longitudinal center of the upper end of the rod, this offset portion being indicated at 24ª. The lower end of the combination lever is connected by means of a link 26 with an arm 25 which extends from the crosshead 15.

The ports which provide communication between the engine cylinder 5 and the valve chamber 6 are indicated at 19.

Operation of the piston 14 will through the link 26 and arm 25 of the crosshead 15, impart movement to the combination lap and lead lever 24 as will be readily understood. If the lever 24 was straight, the lap and lead movement upon one side of the vertical position of said lever would be greater than the movement upon the opposite side of the vertical position of the said lever, due to the angularity of the main connecting rod 16. This would result in an error of the operation of the valve.

This is illustrated in Figure 6 of the drawings where the distance between the points F. A. and G. A. is greater than the distance between the points F. A. and H. By providing the offset portion 24ª in the lever 24 the back half of the stroke is increased as indicated at L, the distance from F to L being equal to the distance between F to G. The valve therefore has an equal travel upon opposite sides of its mid position.

Assuming the circle described by the main crank pin is divided into four equal parts indicated at E, J, K, and O, (Figure 15). The main crank pin will travel from front dead center K to bottom quarter O, consequently the back end of the main rod 16 has also made one-half throw (measured on main crank pin circle) K to O, yet the front end of the main rod 16 which is connected to the crosshead 15 has made more than one-half stroke horizontally.

This is due to the fact that the back end of main rod 16 assumes an angular position from a center line horizontally parallel through the wrist pin of the crosshead 15, with the main pin 17 at top quarter J or bottom quarter O positions the crosshead 15 is back of midway positions M. P. The distance indicated between the points M. P. and 15ª equals the main rod error and reduces proportionately the efficiency of the crosshead movement and creates an error in the valve movement through the combination lever 24.

Assuming that the radius rod 33 and the block 32 are moved to neutral position at N (Figure 15). In this position the radius rod and its connections would be stationary and if a rotary motion of the driver 18 is made, and as the main pin 17 occurs at either mid-positions O or J, (Figure 6) so will also occur simultaneously the lap and lead lever 24 and the valve 20 in their respective mid-positions.

At each complete rotation of the driver 18, the main crank pin 17 makes a half stroke from center K to quarter position O or J. This movement of the combination lever 24 gives the valve a one-half lap and lead movement. The main pin 17 accomplishes the remaining stroke from positions O or J to back center E or vice versa. The main rod error indicated from M. P. to 15ª (Figure 6) being back of mid-position, the stroke of the crosshead 15 from 15ª to back center B. C. is shorter and slower than the stroke from front center F. C. to 15ª and when the crosshead is moving between points 15ª and B. C. the acceleration of the combination lever is increased due to the rise of the lever described by the G. L. The distance from F to L is equal to the swing of F to G. Thus an equal lap and lead movement occurs upon opposite sides of midposition.

The reciprocatory motion of the crosshead 15 through the lap and lead lever 24, and the rotary motion of the return crank 30 and its connections with the radius rod crosshead 35, combine to produce a single lesser movement to the valve 20 and during its cycle of action are periods when the valve and the port edges of the ports 19 register the events of pre-admission, cut-off, release, and closure. These events occur at various points of piston stroke.

The movement of the lower end of the combination lap and lead lever is determined by the stroke of the piston and the crosshead 15.

The movement of the radius rod 33 is controlled by the position of the link block 42 within the curved link 32, the said link being pivotally mounted within the supports 9 and oscillated by the operation of the driver 18. Assuming that the combination fulcrum pin 28 is positioned at a definite point in the slots 40 and 41, the movement imparted to the valve 20 will equal the sum of the swinging movement of the combination lever upon the pin 23, plus the horizontal throw imparted by the link 32 to the radius rod 33 and to the main valve crosshead 35, the action of the crosshead 35 affecting the movement of the combination lever 24 due to the connection between said combination lever and arm 49. When the link block 42 is aligned with the trunnions 43, the only motion imparted to the valve will be the minor reciprocal movement of the valve crosshead 22 to which the lever 24 is connected, for at such time the radius rod will be stationary as will be the radius rod cross head 35. The proportion of the parts is such that when the reversing lever is in vertical position, the link block 42 will be held at the center of the link. Movement of the reversing lever in either direction from the vertical position will shift the block toward one end of the link and the latter being in constant oscillation, movement will be imparted to the radius rod proportional to the distance of the link block from the center of the link. A reversal of the reversing lever from one side of the vertical position to the other causes the link block 42 to be shifted toward the opposite end of the link and reverses the reciprocation of the valve with respect to the piston so as to reverse the operation of the engine.

By changing the position of the radius rod, the distance between the pivot pins 34 and 28 may be regulated, the bearing blocks 27 and 39 being moved relative to the pivot pin 23 of the lever 24. This is clearly illustrated in Figures 9 and 12 of the drawings. The extended upright arm 36 of the radius rod 33 moves in an arc relative to the pin 34 and carries with it the lower end of the link 37 joined by the pin 38 and the upper end of said link is bifurcated to receive the block 39 and is joined thereto by the fulcrum pin 28, the block 39 traveling in the slot 40. By adjusting the block 42, the tumbler arm 36 may be moved either forward or backward so as to selectively position the bearing blocks 27 and 39 and thus vary the distance between the pivots 28 and 34. Such adjustment varies the length of the upper arm of the combination lever between the pivots 23 and 28 and effects the degree of movement of the crosshead 22 by lowering the pivot pin 28 so that the throw or movement of the valve may be diminished. By raising the pin 28 and increasing the distance between this pin and the pivot 23 movement of the valve is increased.

It is desirable to add to the stroke of the valve in this manner when motion of the radius rod is reduced by the approach of the link block to the center of the link, and reversely, it is desirable to subtract from the motion of the valve in proportion to the movement of the link block toward either end of the link 32 in order that the lead shall be decreased as the cut-off is increased and vice versa. This is effected by means of the adjustments just described.

It is to be noted that the oscillating curved link 32 is pivotally mounted at 43 by plates 44. The length of the radius rod 33 is defined by that portion of the rod between the pivot 34 and the pivot 42ª, the latter moving on the arc of the link 32, and when the piston is at the beginning of a stroke, the prescribed lead of the valve is present, the said lead being determined by the degree of the angle between the combination lever pivot 23 and the vertical line through the pivot pin 34. Assume the piston at a dead center position, the curved link will assume a vertical position because the return crank pin 29 is fixed at an angle of ninety degrees from the main crank pin 17. This causes the return crank pin to assume the midway position at top S or bottom R (Figure 15).

The radius rod 33 with its block may be moved from one end of the link to the other; no movement is imparted horizontally at the front end of the radius rod pivot 34. A movement of the radius rod from neutral position toward either end of the link 32 (as shown at N Figure 15) will define various cut-offs of the valve. It will also simultaneously control the adjustments that provide a variable lead to the valve. It will be thus apparent that the construction and arrangement of the parts are such that the combination lap and lead lever 24 at its pivot 23 and the front end of the radius rod 33 at its pivot 34, are prevented from moving vertically to a horizontal line of the valve movement. In fact, the advantages of the invention are accomplished in a manner contrary to the methods employed in the usual type of valve gears.

The invention is susceptible of various changes in its form, proportions and minor details of construction and the right is herein reserved to make such changes as properly fall within the scope of the appended claims.

Having described the invention what is claimed is:—

1. In a valve gear, the combination of a valve and its rod, a piston and its crosshead, a combination lever having a fulcrum, a radius rod, a crosshead supporting one end of the radius rod, a crosshead supporting a combination lever, a pivotal connection between the combination lever connected crosshead and combination lever and adjustable means operatively connecting the radius rod connected crosshead and combination lever connected crosshead to vary the degree of horizontal reciprocation of the combination lever connected crosshead relative to the horizontal reciprocation of the radius rod connected crosshead to yield a varied lead for the valve relative to the symmetrical position of the reversing lever.

2. In a valve gear, the combination of a valve and its rod, a piston and its crosshead, a combination lever, a radius rod, a crosshead connected to one end of the radius rod, a pivotal connection between the radius rod and said crosshead, a crosshead connected to the valve rod, means including a pivotal connection between the radius rod connected crosshead and the combination lever, and means whereby the pivotal connection between the radius rod connected crosshead and the combination lever may be adjusted with the radius rod relative to the pivotal connection of the combination lever connected crosshead to automatically vary the degree of horizontal reciprocation of the combination lever connected crosshead relative to the horizontal reciprocation of the radius rod connected crosshead to yield a varied lead for the valve relative to the symmetrical position of the reversing lever.

3. In a valve gear, the combination of a valve and its rod, a piston and its crosshead, a combination lever having a fulcrum, a radius rod, a crosshead supporting one end of the radius rod, a crosshead connected to the valve rod, said crosshead supporting a combination lever, a pivotal connection between the combination lever connected crosshead and combination lever and means controlled by the radius rod and operatively associating the radius rod connected crosshead and combination lever to automatically vary the degree of horizontal reciprocation of the combination lever connected crosshead relative to the horizontal reciprocation of the radius rod connected crosshead to yield a varied lead for the valve relative to the symmetrical position of the reversing lever.

4. In a valve gear, the combination of a valve and its rod, a piston and its crosshead, a combination lever, a radius rod, a crosshead supporting one end of the radius rod, a crosshead connected to the valve rod, said crosshead supporting a combination lever, a pivotal connection between the combination lever connected crosshead and the combination lever, an arm extending from the radius rod, a link having one end pivotally secured to the arm, a sliding pivotal connection between the radius rod connected crosshead and the combination lever forming a fulcrum for said lever, and a pivotal connection between said sliding connection and link to automatically regulate the lead of the valve by adjustment of the radius rod.

5. In a valve gear, the combination with a valve and its rod, a piston and its crosshead, a combination lever having a sliding pivotal connection at one end thereof, a radius rod, a crosshead connected to the radius rod, an upwardly disposed inverted substantially U-shaped slotted arm extending from the radius rod connected crosshead, a crosshead connected to the valve rod, bearing blocks slidable in the slots of the U-shaped arm and combination lever, a pivot pin connecting said blocks, an arm extending from the radius rod and a link having one end pivotally connected to the U-shaped arm bearing block to provide a toggle joint connection between the radius rod and combination lever for adjusting the fulcrum to regulate the lead of the valve.

6. In a valve gear, the combination with a valve and its rod, a piston and its crosshead, a combination lever having a crosshead, a radius rod, a crosshead connected to one end of the radius rod, an upwardly disposed inverted substantially U-shaped arm extending from the radius rod connected crosshead, a crosshead connected to the valve rod and movable relatively of the radius rod crosshead, a substantial bracket having guides thereof for said crossheads, a pivotal connection between the combination lever connected crosshead and combination lever, bearing blocks slidable in the slots of the U-shaped arm and combination lever, a pivot pin connecting said blocks, an arm extending from the radius rod and a link having one end pivotally secured to the radius rod arm and its opposite end pivotally connected to the U-shaped arm bearing block to provide a toggle joint adjustment between the radius rod and combination lever for adjusting the fulcrum to regulate the lead of the valve.

In testimony whereof I affix my signature.

FRANK BUKOVE.